UNITED STATES PATENT OFFICE.

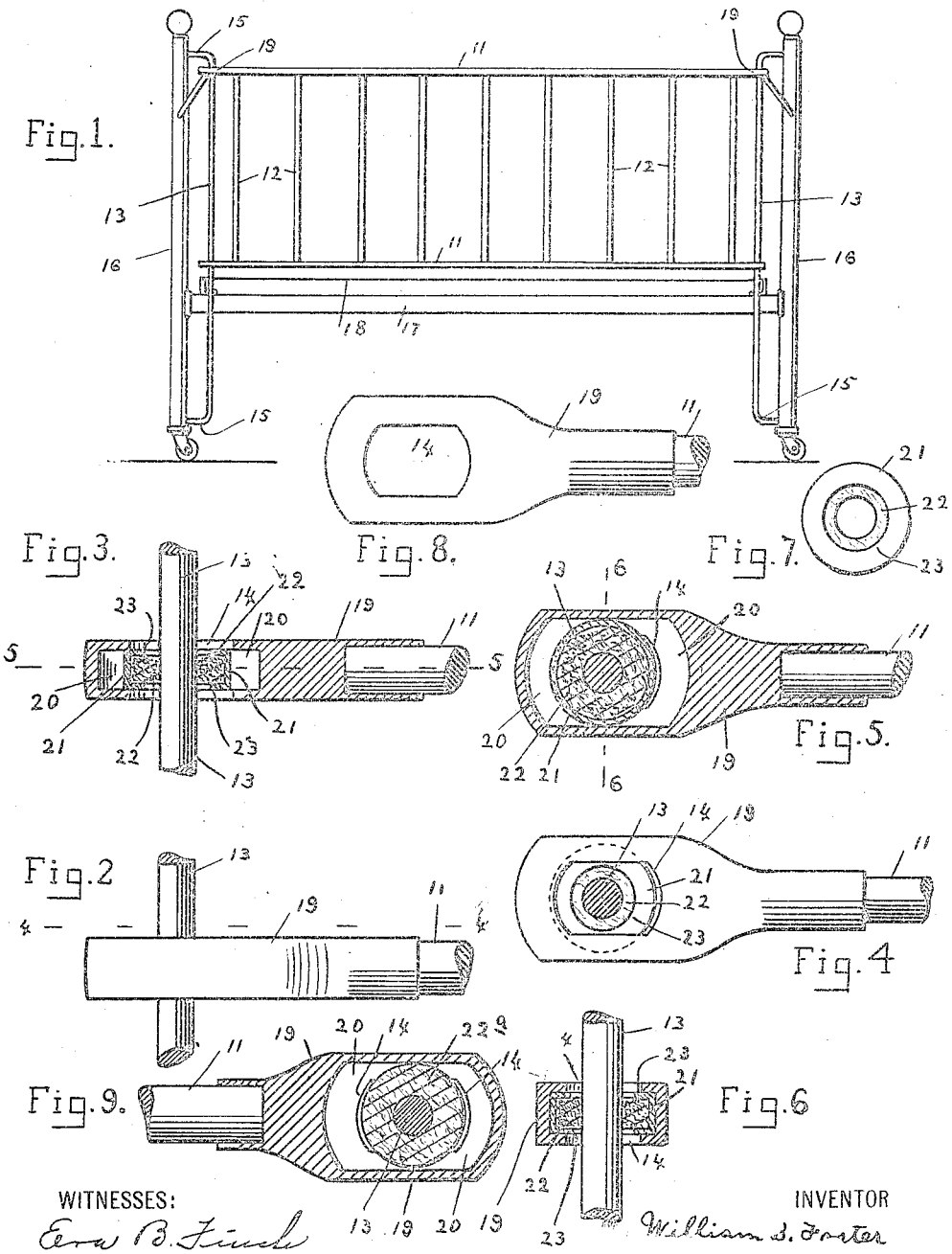

WILLIAM B. FOSTER, OF UTICA, NEW YORK, ASSIGNOR TO FOSTER BROTHERS MANUFACTURING COMPANY, OF UTICA, NEW YORK, A CORPORATION.

JOINT FOR SLIDING-SIDE CRIBS.

1,151,775.  Specification of Letters Patent.  Patented Aug. 31, 1915.

Application filed December 2, 1914. Serial No. 875,082.

*To all whom it may concern:*

Be it known that I, WILLIAM B. FOSTER, of Utica, in the county of Oneida and State of New York, have invented certain new and useful Improvements in Joints for Sliding-Side Cribs; and I do hereby declare that the following is a full, clear, and exact description thereof, which will enable others skilled in the art to which it appertains to make and use the same, reference being had to the accompanying drawings, and to the reference - numerals marked thereon, which form part of this specification.

My present invention relates to joints for sliding side cribs such as are used to slidingly mount the sliding side of a crib upon the vertical guide rods of the crib.

The purpose of my invention is to provide an improved device of the character described and one that is economical in construction and more efficient and convenient than the joint heretofore commonly used.

It is a further purpose of my invention to provide a device of the character described wherein a washer of felt, fiber, wood or other nonmetallic material is interposed between the material of the guide rod and the metal of the end of the sliding side mounted on said guide rod and moreover to have this washer allowed movement longitudinally of the sliding side rod so that the said washer may adjust itself to variations in distance between the two guide rods upon one side of the crib. By providing for such movement the washer may be fitted much more tightly against the guide rods and will maintain such relatively tight fit because the operation of the sliding side will not tend to wear or elongate the hole in the washer.

A still further purpose of my invention is to inclose said washer of felt, or other somewhat elastic material within a casing, which casing is at all times between the washer and the metal of the elongated slot of the sliding side ends. The inclosing of the washer in this casing enables the washer to be held more firmly against the guide rod and permits the washer to more easily slide in the longitudinal slot of the sliding side ends than would be the case if the felt made direct contact with the metal of the slot.

A further advantage of this feature of my invention is that it allows the washer of felt or similar material to be held under considerable compression and thus firmly against the guide rod while the casing prevents the washer expanding against the slot which would prevent the sliding motion of a washer of expansive material.

Further objects of my invention will be apparent from the detailed specification and from the claims hereinafter set forth.

Figure 1 is a side elevation of a sliding side crib illustrating my invention. Fig. 2 is a side elevation of a part of a guide rod and the adjacent end of the sliding side embodying my invention. Fig. 3 is a vertical sectional view of the parts shown in Fig. 2. Fig. 4 is a horizontal sectional view on line 4—4 of Fig. 2 and Fig. 5 is a horizontal sectional view on line 5—5 of Fig. 3. Fig. 6 is a vertical sectional view on line 6—6 of Fig. 5. Fig. 7 is a top or bottom view of the washer inclosed in its casing. Fig. 8 is a top or bottom view of the projecting end of the sliding side as seen in Fig. 4 but without the washer, the casing or the guide rod. Fig. 9 is a horizontal sectional view similar to Fig. 5 of a modified form of my invention.

Referring to the drawings in a more particular description, Fig. 1 shows in side elevation the common form of a sliding side crib wherein the sliding side consisting of top and bottom bars 11 connected by upright rods 12 is slidingly mounted at each end upon vertical guide rods 13 at each end of the crib as by having the projecting ends of the bars 11 provided with a vertical slot 14 extending longitudinally of the said bar and receiving therein the said guide rods 13. The guide rods 13 are mounted in vertical position as by means of their ends 15 being bent to the posts at the top and bottom, and suitably secured thereto. The corner posts on each side are securely connected to each other in any desired way by the usual connecting rails 17 affording support for the springs 18 in the usual manner.

The ends 19 of the top and bottom bars 11 of the sliding side are provided with vertical slots 14 extending longitudinally of said side and the said slot 14 between the top and bottom of the said end 19 is cut away or so shaped as to provide a recess 20 extending into the material of said end 19 from the main opening of said slot so that said end forms a housing in which is securely located a casing 21 adapted to slide in said housing longitudinally of said slot. Within the casing is a washer 22 of felt or similar material preferably somewhat expansive and readily sliding upon the vertical guide rod 13 without noise.

The washer 22 is preferably an annular ring of desired material as felt, leather, wood, fiber or other non-metallic substance having a central aperture of such size as to snugly slide upon the vertical rod 13. The casing 21 will also preferably be in the form of an annular ring encircling the washer 22 and having at top and bottom an inwardly extending flange 23 turned back over the top and bottom respectively of the said washer to a point approaching the aperture therein. This casing will hold the washer from expansion diametrically or transversely against the surrounding surfaces of the housing and will also hold the felt in desired state of compression against the guide rod 13. It will be obvious that the washer thus incased will slide longitudinally of the slot without coming into engagement therewith and will thus permit of much freer motion of said washer longitudinally of the slot than would be the case were the washer permitted to engage the housing directly.

It will now be seen that by providing a washer which has a motion longitudinally of the ends of the sliding side and particularly where easy motion of said washer is insured by keeping it from expanding against its housing, the sliding side can be readily operated notwithstanding the fact that the guide rods at opposite ends of the side may not be parallel. It will be further noticed that if desired the washer may be made slidable only on one end of each top or bottom bar 11 of the side and the washer at the other end may be of the usual non-sliding character.

It will be noted that this provision for longitudinal movement of the washers relative to the sides allows the washers to fit the guide rods more closely than would otherwise be the case and thus avoids an unpleasant looseness or rattling of the side and also prevents the wearing or elongating of the aperture in a washer which results where the washer has to adjust itself to unequal distances between the guide rods without the washer itself being permitted corresponding movement.

It will be understood that various modifications from the form of the device illustrated and described may be made without departing from the spirit of my invention.

Fig. 9 is a horizontal sectional view illustrating a modified form of my invention. In this form a washer 22 A is used in the elongated recess 20 without a casing 21 being interposed between the washer and the walls of said recess 20. This allows the desired longitudinal adjustment of the washer in recess 20, and is adapted to secure a sufficient freedom of motion when the washer is composed of relatively firm material such as wood, fiber or well compressed felt.

What I claim as new and desire to secure by Letters Patent is:

1. The combination in a sliding crib of a vertical guide rod, a side having its end vertically slotted longitudinally of said side and mounted thereby on the guide rod and a washer of non-metallic substance encircling said guide rod and mounted in said slot so as to slide longitudinally thereof.

2. The combination in a sliding side crib of a vertical guide rod, a side having its end vertically slotted longitudinally of said side and mounted thereby on the guide rod, a washer of felt or the like encircling said guide rod and mounted in said slot so as to slide longitudinally thereof and means engaging and holding said washer from expansion against said slot.

3. The combination in a sliding side crib of a vertical guide rod, a side having its end vertically slotted longitudinally of the said side and mounted thereby on the guide rod, a washer of felt or other non-metallic substance encircling said guide rod and a casing slidable longitudinally of said slot and incasing said washer.

4. The combination in a sliding side crib of a vertical guide rod, a side having its end vertically slotted longitudinally of the said side and mounted thereby on the guide rod, a washer of felt or the like encircling said guide rod and a casing slidable longitudinally of said slot and incasing said washer and holding said washer in a state of compression.

5. The combination in a sliding side crib of a vertical guide rod, a side having its end vertically slotted longitudinally of the said side and mounted thereby on the guide rod, a washer of felt or the like encircling said guide rod and a casing slidable longitudinally of said slot and incasing said washer and holding said washer from expansion against said slot.

6. The combination in a sliding side crib of a vertical guide rod, a side having its end vertically slotted longitudinally of the said side and mounted thereby on the guide rod, a washer of felt or the like encircling said guide rod and a casing slidable longitudinally of said slot and incasing said washer and holding said washer compressed against said guide rod and from expansion against said slot.

7. The combination in a sliding side crib of a vertical guide rod, a side having its end adjacent to said vertical guide rod, a washer of non-metallic material encircling said guide rod and mounted on the end of said side so as to slide longitudinally thereof.

8. The combination in a sliding side crib of a vertical guide rod, a side having its end adjacent to said vertical guide rod, a washer of felt or the like encircling said guide rod and mounted on the end of said side so as to slide longitudinally thereof and a casing about said washer holding the same from outward expansion.

In witness whereof I have affixed my signature, in the presence of two witnesses, this 10th day of Nov. 1914.

WILLIAM B. FOSTER.

Witnesses:
 HARRIET WILLIAMS,
 W. G. STONE.